United States Patent [19]

Weyand

[11] Patent Number: 4,771,511
[45] Date of Patent: Sep. 20, 1988

[54] TOOL AND METHOD FOR DEBONING FISH

[76] Inventor: Patrick J. Weyand, 18335 Country Club Cir., Riverview, Mich. 48192

[21] Appl. No.: 73,051

[22] Filed: Jul. 13, 1987

[51] Int. Cl.$^4$ ............................................. A22B 25/16
[52] U.S. Cl. ......................................... 17/46; 17/68; 17/56
[58] Field of Search ................... 17/46, 56, 68, 11.1 R

[56] References Cited

U.S. PATENT DOCUMENTS

| | | | |
|---|---|---|---|
| 795,013 | 7/1905 | Weiler | 17/11.1 R |
| 2,224,045 | 12/1940 | Gibbs | 17/56 X |
| 2,810,154 | 10/1957 | Wiesenhofer | 17/68 |

Primary Examiner—Willie G. Abercrombie
Attorney, Agent, or Firm—Cullen, Sloman, Cantor, Grauer, Scott and Rutherford

[57] ABSTRACT

A tool for grasping and manually removing a number of the pin bones from fillets of large fish, such as whitefish, lake trout, haddock, scrod and the like, is disclosed. A pair of pinching members, formed of flat, springy, sheet metal plates arranged in overlapping relationship, are attached to the ends of a forcep-type body portion. Manual forces applied to the body portion move adjacent free edges of the plates together to grasp pin bones between them. The free edge of one of the pinching members is bent inwardly towards the adjacent free edge of the other member to fit around and grip the curved end portions of the pin bones which are adjacent the surface of the fish fillet. A method for deboning the fish is also disclosed, whereby a number of pin bones may be removed simultaneously from a fish fillet.

11 Claims, 1 Drawing Sheet

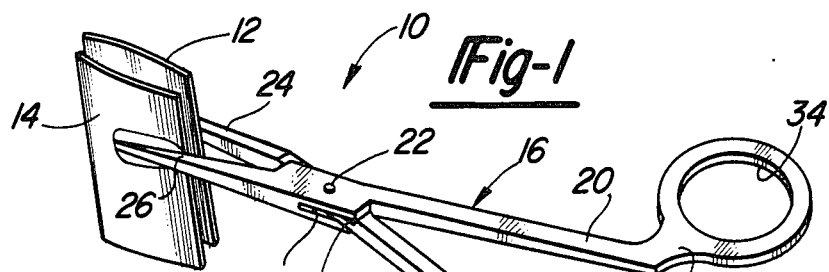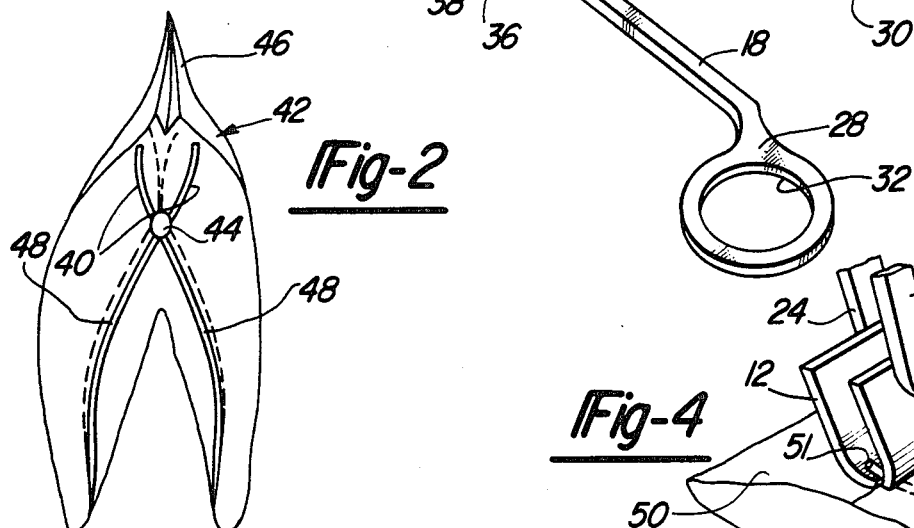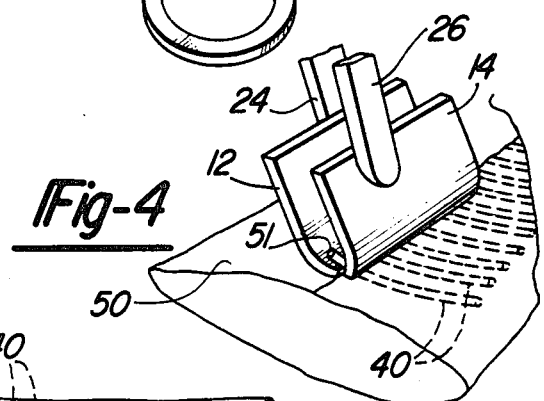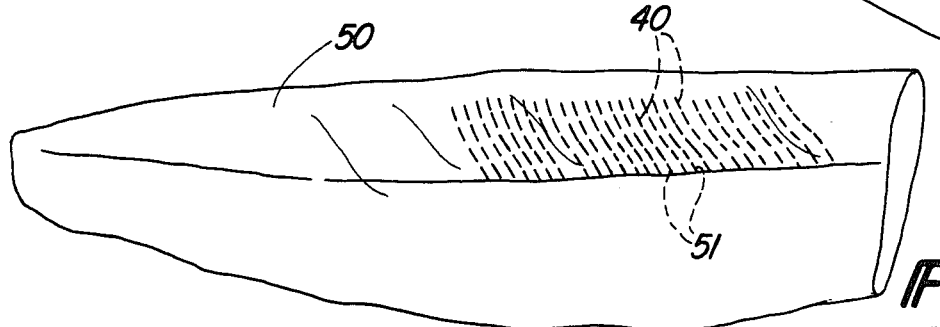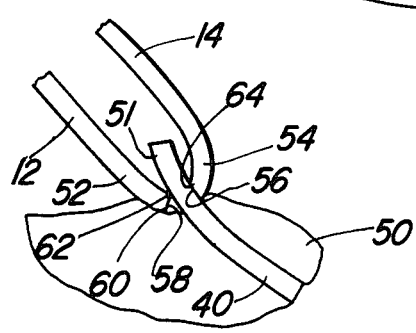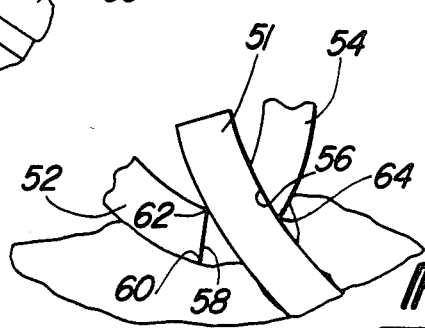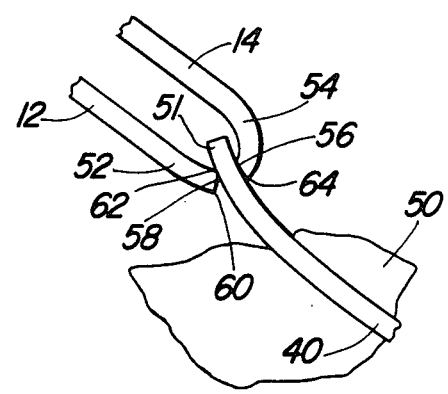

TOOL AND METHOD FOR DEBONING FISH

FIELD OF THE INVENTION

The present invention relates to a tool and method for deboning fish and, particularly, for removing the pin bones from fillets of large fish, such as whitefish, lake trout, haddock, scrod and the like.

BACKGROUND OF THE INVENTION

It has long been recognized that it is desirable to remove all of the bones from a fish fillet prior to cooking. Prior tools and methods for removing fish bones have included cutting the fish into two fillets, which although effective for removing the backbone and ribs, were unsuccessful for removing the small, curved pin bones from the fillets. The pin bones extend along the sides of the backbone for about two-thirds of the length of the fish. In large fish, such as whitefish, lake trout, haddock and scrod, removal of the pin bones either requires that they be painstakingly removed one at a time by hand, while avoiding breaking them, or that the portion of the fish fillet containing the pin bones be cut out and discarded. In contrast, in the case of small fish, such as perch, the pin bones are normally left within the fish. Removal is unnecessary from such small fish because the pin bones are small and will dissolve during cooking.

Thus, there has been a need for a tool and a method for deboning fish which is particularly adapted for removing the pin bones efficiently and thoroughly from large fish, such as whitefish, lake trout, haddock, scrod and the like. Also, such a tool should be capable of removing a number of pin bones simultaneously.

SUMMARY OF THE INVENTION

The invention herein contemplates a tool for deboning fish, particularly adapted for removing a number of pin bones from large fish, such as whitefish, lake trout, haddock, scrod and the like. The tool includes a pair of opposed, plate-like, springy pinching members attached to a pinching means, such as a forcep-type body portion. At least one of the pinching members has a free edge bent inwardly relative to the other pinching member. The body portion includes a first lever and a second lever pivotally joined together about a pivot axis, whereby forces may be applied to one end of the body portion to bring the opposed pinching members into engagement with one another, whereby a number of pin bones may be gripped between the opposed pinching members for removal from the fish.

In the disclosed embodiment, the first lever and the second lever each have two ends, whereby one pinching member is attached to one end of the first lever and the other pinching member is attached to one end of the second lever. The other ends of the levers each include an opening so that a finger and a thumb of the user may be inserted into the openings to apply a force to the ends of the levers. The forces include a force in one direction to one lever and a force in an opposite direction to the other lever so that grasping forces are provided along the pinching members.

In the preferred embodiment, the inwardly bent free edge of the pinching member includes an end surface parallel to a pin bone adjacent thereto between the opposed pinching members. Also, the other pinching member includes an inwardly bent free edge having an end surface at an acute angle to a pin bone adjacent thereto. The acute bent free edge is bent less than the parallel bent free edge to form at least one point for gripping a pin bone adjacent thereto and opposed to the parallel end surface. Further, the parallel end surface of the bent free edge of the other pinching member includes a line at an acute angle to a pin bone for facilitating placement of the pinching member adjacent the pin bone.

The method of the present invention for deboning the fish includes the steps of placing an end surface of an inwardly bent free edge of a pinching plate adjacent the convex side of the end portions of a number of curved pin bones, and placing an end surface of an inwardly bent free edge of another pinching plate on the concave sides of the end portions of the number of curved pin bones opposite the first mentioned end surface. The pair of opposed pinching plates are attached to one end of a forcep-type body portion. Next, the curved pin bones are pinched between the pinching plates by applying forces to another end of the body portion. Lastly, the curved pin bones are removed from the fish by pulling on the end portions of the curved pin bones in a substantially upward direction.

In the disclosed embodiment of the method, the fish has initially been partially deboned by removing a backbone and a plurality of ribs from the fish to form two fillets. In addition, one of the fish fillets is placed on a flat surface and inspected for curved pin bones.

BRIEF DESCRIPTION OF THE DRAWINGS

The various features, objects, benefits and advantages of the present invention will become more apparent by reading the following detailed description in conjunction with the drawing where like reference numerals identify corresponding components, and:

FIG. 1 is a perspective view of the tool for deboning fish of the present invention;

FIG. 2 is a schematic end view, in perspective, of a partially cleaned fish illustrating the skeletal structure;

FIG. 3 is a perspective view of a partially boned fillet of the fish illustrated in FIG. 2 with the pin bones protruding the flesh of the fish;

FIG. 4 is a fragmentary, perspective view of the fish fillet of FIG. 3 illustrating the placement of the pinching members of the tool relative to the pin bones of the fish;

FIGS. 5 and 6 are enlarged, schematic, fragmentary side views illustrating the pinching members of the tool grasping a pin bone; and FIG. 7 is an enlarged, schematic, fragmentary side view illustrating the pinching members of the tool pulling a pin bone from the fish fillet.

DETAILED DESCRIPTION OF THE PREFERRED EMBODIMENT

Referring to FIG. 1, the deboning tool, generally designated 10, includes a pair of opposed pinching members 12 and 14 attached to a forcep or scissor-type body portion 16. The body portion includes a first member or lever 18 and a second member or lever 20 pivotally connected together about a pivot point 22. One pinching member 12 is attached to one end 24 of the first member 18, and the other pinching member 14 is attached to one end 26 of the second member 20. The pinching members 12 and 14 are opposed to one another such that when forces are applied to the other ends 28 and 30 of the first and second members 18 and 20, the members 18 and 20 rotate about pivot point 22 thereby bring the free edges of the pinching members into engagement with one another. The ends 28 and 30 of the members 18 and 20 each have a hole 32 and 34 for accommodating the thumb and forefinger of the user for applying forces for opening or closing the tool 10. The forces in the preferred embodiment include a force applied to the first member 18 in one direction and a force applied to the second member 20 in the opposite direction.

It should also be appreciated that a tong-type body portion (not shown) may also be utilized without departing from the present invention. However, it is preferred that a forcep or scissor-type body portion 16 be utilized because of the amount of gripping forces provided at the opposite end through the lever action. Thus, in the preferred embodiment, the first member 18 includes a flat portion 36 accommodated by a slot 38 formed in the second member 20 and rotatable about the pivot point 22. In this way, the length of the members 18 and 20 and the position of the pivot point 22 can be varied to provide sufficient forces to securely grip the pin bones 40, to be removed from the fish, between the pinching members 12 and 14.

The deboning tool 10 of the present invention is particularly adapted for removing a number of the pin bones 40 of large fish 42, such as whitefish, lake trout, haddock, scrod and the like, the skeletal structure of which is illustrated in FIG. 2 with the head, organs and scales removed to partially clean the fish. The pin bones 40 run along the backbone 44 of the fish 42 for about two-thirds of the length of the fish beginning at the dorsal fin 64. The pin bones 40 are at approximately a 45° angle with the backbone in one direction and are curved to the side in another direction. To partially debone the fish, an incision is first made along the backbone 44 and ribs 48 of the fish serving the pin bones from the backbone along one side, and then an incision is made along the other side of the fish to cut two fillets therefrom. One fillet 50 is illustrated in FIGS. 3 and 4 with the pin bones 40 protruding from the flesh of the fish to expose their end portions 51, which are slightly curved having a concave side and a convex side. Little or no bone may protrude from the flesh of the fish depending upon how close and how clean a cut is made along the backbone. If none or very little pin bones protrudes from the flesh it is hard to determine if any pin bones 40 are in the flesh and where they are located by visual inspection or by running a hand along the fish fillet.

As illustrated in FIGS. 1 and 4 and in greater detail in FIGS. 5, 6 and 7, the pinching members 12 and 14 are of generally flat, rectangular shaped, thin, sheet metal plates that are arranged perpendicular to the end of the body portion 16. The free edge 52 of one member 12 is bent slightly inward relative to the other member 14 (e.g. less than about 25°) for placement on the concave side of the pin bone 40. The free edge 54 of the other member 14 is bent inward relative to the member 12 (e.g. more than about 25°) for placement on the concave side of the pin bone 40.

The placement of the corresponding edges of the pinching members 12 and 14 over the curved end portion 51 of the pin bone 40 is illustrated in FIGS. 5 and 7. In the preferred embodiment, the end surface 56 of free edge 54 is substantially parallel with the pin bone 40 when the curved bone is grasped between the gripping members 12 and 14. As illustrated in FIG. 6, the end surface 58 of the edge 52 is at an acute angle with the pin bone to form two lines which appear as points 60 and 62. The outer line or point 60 facilitates separation or loosening of the fish flesh from the end portion of the pin bone and the inner line or point 62 grips the pin bone 40.

The end surface 56 of the free edge 54 provides support to the pin bone opposite the gripping point 62 to minimize fracturing of the bone therebetween as the user pulls the bone from the flesh. In the preferred embodiment, the extending ends 56 and 58 may be formed by grinding the ends to the desired angle or bending the free edges sufficiently. In addition, the end surface 56 of the edge 54 includes a sharp line, which appears as point 64, at an acute angle to the pin bone which facilitates separation or loosening of the fish flesh from the end portion 51 of the pin bone 40 along that side of the pin bone. Thus, even if little or none of the pin bone 40 protrudes from the flesh, the end portion 51 of the pin bone may be grasped between the pinching members 12 and 14 for removal.

The pinching members 12 and 14 may be made of substantially rigid, but somewhat springy, stainless steel sheet metal which will resist rusting and be easily cleanable. However, the choice of material of which the deboning tool 10 is made may be based upon economics, availability and manufacturing process requirements. The gripping members 12 and 14 may be welded or brazed to the ends 24 and 26 of the body portion 16. However, the gripping members and the body portion may be integrally constructed as a unitary tool of stainless steel or the like.

OPERATION AND USE

The use of the deboning tool 10 of the present invention to remove the pin bones 40 from the fish fillet 50 is illustrated in FIGS. 4, 5, 6 and 7. After the backbone 44 and the ribs 48 of the fish 42 have been removed, a user may place the fish fillet on a flat surface, such as a table top. The pin bones 40 either will protrude upwardly slightly (see FIG. 4) or can be felt with one hand. The tool 10, in the other hand, is placed with the pinching members 12 and 14 on each side of a number of pin bones 40. The ends 28 and 30 of the tool are manually moved together to tightly grasp the pin bones 40 between the opposed pinching members 12 and 14. Then, the pin bones are removed by pulling upwardly as illustrated by the arrows in FIG. 7.

It is preferred that the pulling motion be carried out with little or no twisting in a basically upward motion to avoid the pin bones tearing the flesh or pulling the bone from the fish with flesh still attached thereto, both of which would adversely affect the appearance of the deboned fish fillet. To avoid breaking the pin bones, the pulling motion should be in a direction which is substantially parallel to the pin bones.

While the preferred embodiment of the present invention has been described so as to enabled one skilled in the art to practice the techniques of the present invention, the preceding description is intended to be exemplary and should not be used to limit the scope of the invention. The scope of the invention should be determined only by reference to the following claims.

I claim:

1. A tool for deboning fish, particularly adapted for removing a number of curved pin bones from large fish, such as whitefish, lake trout, haddock, scrod and the like, comprising:

a pair of thin, springy, sheet metal opposed pinching plates, each of the opposed pinching plates having a free edge bent inwardly relative to the other pinching plate;

one of said bent free edges being bent inwardly greater than the other bent free edge and the greater bent free edge having an end surface parallel to a pin bone adjacent thereto between said opposed pinching plates, and the other bent free edge having an end surface at an acute angle to a pin bone adjacent thereto between said opposed pinching plates to form two lines, one of said lines for gripping pin bones and opposed to the end surface of said greater bent free edge; and a body portion attached to said pair of opposed pinching plates, said body portion including a first lever and a second lever pivotally joined together about a pivot point, whereby forces may be applied to another end of said body portion to bring said opposed pinching plates into engagement with one another so that a number of curved pin bones may be gripped between said opposed pinching plates for removal from the fish.

2. The tool defined in claim 1, wherein said first lever and said second lever each have two ends, one of said opposed pinching plates being attached to one end of said first lever and the other opposed pinching plate being attached to one end of said second lever.

3. The tool defined in claim 2, wherein the other ends of the levers each include an opening, whereby a finger and a thumb of a user may be inserted into the openings to apply forces to the ends of said lever so that grasping forces are provided along said opposed pinching plates.

4. The tool defined in claim 1, wherein said opposed pinching plates are of generally rectangular shape and of sufficient length to grasp a number of curved pin bones therebetween.

5. The tool defined in claim 1, wherein the end surface of the greater bent free edge is angled to contact an end portion of the curved pin bone in flat relationship.

6. A tool for deboning fish, particularly large fish such as whitefish, lake trout, haddock, scrod and the like, comprising:

a pair of thin, springy, opposed pinching members including at least one pinching member having an inwardly bent free edge relative to the other pinching member to contact the other pinching member;

said inwardly bent free edge of said pinching member including an end surface parallel to a pin bone adjacent thereto between said pinching members;

said other pinching member including an inwardly bent free edge having an end surface at an acute angle to a pin bone adjacent thereto, said inwardly bent free edge of the other pinching member being bent less than said first mentioned inwardly bent free edge, the end surface of said less bent free edge forming two lines, one of said lines for gripping the pin bones and opposed to the parallel end surface of said first mentioned inwardly bent free edge; and a body portion attached to said pair of thin, springy, opposed pinching members for bringing the pinching members into engagement with one another so that when forces are applied to said body portion, said opposed pinching members may engage one another, whereby a number of pin bones may be gripped between said opposed pinching members for removal from the fish.

7. The tool defined in claim 6, wherein said body portion includes a first member and a second member pivotally joined together about a pivot point, said first member and said second member each having two ends, and one of said ends being attached to said pair of thin, springy, opposed pinching members and the other ends being adapted for the application of forces thereto.

8. The tool defined in claim 6, wherein said opposed pinching members are generally rectangular plates of sufficient length to grasp a number of pin bones therebetween.

9. A method for deboning a fish, particularly adapted for removing a number of curved pin bones from large fish, such as whitefish, lake trout, haddock, scrod and the like, comprising the following steps:

placing an end surface of an inwardly bent free edge of a pinching plate adjacent the convex side of the end portions of the number of curved pin bones, and placing an end surface of an inwardly bent free edge of another pinching plate on the concave sides of the end portions of said number of curved pin bones opposite the first mentioned end surface, said pinching plates attached to one end of a body portion opposed to one another;

pinching the end portions of said number of curved pin bones between said opposed pinching plates by applying forces to one end of said body portion; and pulling on said number of curved pin bones in a substantially perpendicular direction relative to said fish, whereby said number of curved pin bones are removed from said fish.

10. The method defined in claim 9, further comprising the step of partially deboning said fish by removing a backbone and a plurality of ribs from the fish to form two fillets.

11. The method defined in claim 10, further comprising the step of placing one fish fillet on a flat surface and inspecting said fish fillet for curved pin bones.

* * * * *